US007628334B2

(12) United States Patent
Mizuno et al.

(10) Patent No.: US 7,628,334 B2
(45) Date of Patent: Dec. 8, 2009

(54) CONTENT DATA USAGE APPARATUS

(75) Inventors: Shigehiko Mizuno, Hamamatsu (JP); Shigeki Akahori, Hamamatsu (JP)

(73) Assignee: Yamaha Corporation (JP)

( * ) Notice: Subject to any disclaimer, the term of this patent is extended or adjusted under 35 U.S.C. 154(b) by 748 days.

(21) Appl. No.: 11/298,858

(22) Filed: Dec. 9, 2005

(65) Prior Publication Data
US 2006/0124735 A1 Jun. 15, 2006

(30) Foreign Application Priority Data
Dec. 10, 2004 (JP) ............................. 2004-357822

(51) Int. Cl.
*G06K 19/06* (2006.01)
(52) U.S. Cl. ...................... 235/492; 235/451; 235/383; 707/1
(58) Field of Classification Search ................. 235/451, 235/383, 492; 705/27, 229, 219, 51; 707/1
See application file for complete search history.

(56) References Cited

U.S. PATENT DOCUMENTS

| | | | | |
|---|---|---|---|---|
| 5,894,100 | A * | 4/1999 | Otsuka ...................... 84/477 R |
| 6,784,355 | B2 * | 8/2004 | Gyoten et al. .................. 84/622 |
| 2001/0044848 | A1 * | 11/2001 | Kikuchi et al. ............... 709/229 |
| 2002/0049717 | A1 * | 4/2002 | Routtenberg et al. ........... 707/1 |
| 2002/0066042 | A1 * | 5/2002 | Matsumoto et al. .......... 713/202 |
| 2002/0121180 | A1 * | 9/2002 | Kondo .......................... 84/609 |
| 2003/0033223 | A1 * | 2/2003 | Mizuno ........................ 705/27 |
| 2003/0037124 | A1 * | 2/2003 | Yamaura et al. ............. 709/219 |
| 2004/0056891 | A1 * | 3/2004 | Hiratsuka .................... 345/744 |
| 2004/0094618 | A1 * | 5/2004 | Okamura et al. ............. 235/380 |
| 2004/0140975 | A1 * | 7/2004 | Saito et al. ................... 345/418 |
| 2004/0159215 | A1 * | 8/2004 | Tohgi et al. ................... 84/609 |
| 2004/0195325 | A1 * | 10/2004 | Kogawa ....................... 235/451 |
| 2004/0210765 | A1 * | 10/2004 | Erickson ..................... 713/200 |
| 2005/0211771 | A1 * | 9/2005 | Onozu ......................... 235/383 |

OTHER PUBLICATIONS

"I-Mode Operation Guide," 04.11, the 62nd edition, (retrieval on Nov. 2005) p. 57-61 Internet: URL: http://www.nttdocomo.co.jp/p#s/f/imode#sousa.html.
Yoshinaga, H. et al, i-mode FeliCa, NTT DoCoMo Technical Journal, vol. 12 No. 3 (Oct. 1, 2004), The Telecommunications Association, p. 25-32.

* cited by examiner

*Primary Examiner*—Kristy A. Haupt
(74) *Attorney, Agent, or Firm*—Rossi, Kimms & McDowell, LLP (57) ABSTRACT

An electronic musical instrument has a protected storage unit in which a plurality of music content data are preset and stored in an unusable state where a user cannot freely use. A content selection unit is operated by the user to select a desired one of the music content data from the plurality of the music content data. A content use control unit causes an external settlement apparatus to make settlement for purchasing the desired music content data to thereby enable use of the desired music content data selected by the content selection unit, and brings the desired music content data into a usable state when a completion notification indicating that the settlement is completed is received from the external settlement apparatus. A play unit is operable to use the desired music content data for generating or reproducing music sounds according to the desired music content data.

6 Claims, 8 Drawing Sheets

FIG. 4A
OUTLINE OF ROM CONTENT

| CONTROL PROGRAM OF ELECTRONIC INSTRUMENT |
|---|
| INITIAL VALUE |
| PRESET MUSIC CONTENT DATA (FREE USE IS POSSIBLE) |
| PRESET MUSIC CONTENT DATA (FREE USE IS IMPOSSIBLE) |
| OTHERS |

FIG. 4B
DATA CONTENT

| MUSICAL COMPOSITION PERFORMANCE DATA 1 |
|---|
| MUSICAL COMPOSITION PERFORMANCE DATA 2 |
| MUSICAL COMPOSITION PERFORMANCE DATA m |
| AUTOMATIC ACCOMPANIMENT DATA 1 |
| AUTOMATIC ACCOMPANIMENT DATA 2 |
| AUTOMATIC ACCOMPANIMENT DATA n |
| TONE COLOR DATA 1 |
| TONE COLOR DATA 2 |
| TONE COLOR DATA p |
| AUDIO DATA 1 |
| AUDIO DATA 2 |
| AUDIO DATA q |

FIG. 4C
DETAILS OF DATA

| MUSICAL COMPOSITION INFORMATION |
|---|
| TIMING 1 |
| EVENT 1 |
| TIMING 2 |
| EVENT 2 |

| CODE PATTERN |
|---|
| RHYTHM PATTERN |

| ATTACK PART WAVEFORM |
|---|
| SUSTAIN PART REPETITION WAVEFORM |

| MUSICAL COMPOSITION INFORMATION |
|---|
| WAV DATA |

| KEY CODE |
|---|
| NOTE LENGTH |
| VELOCITY |

CONTENT DATA USAGE APPARATUS

BACKGROUND OF THE INVENTION

1. Field of the Invention

The present invention relates to a content data usage apparatus which selects desired content data from many content data and enables use thereof.

The content data include music content data such as, for example, musical sound control data stored in an electronic instrument, audio data, and music data of musical compositions.

2. Description of the Related Art

In a conventional electronic instrument, many musical sound control data, for example, musical composition performance data for a demonstration performance, accompaniment data, tone color data and effect data for realizing a musical sound generation function of the electronic instrument, a set (registration data) of performance setting data suitable for musical composition performance of a desired genre, music data of many musical compositions and the like are preset in a ROM (Read Only Memory) of the electronic instrument, and the shipment is made in a state where a user can freely use them.

However, since the level of proficiency in performance and the preference in music genre vary according to the user, in order to satisfy all users, not only a storage device having large storage capacity is needed, but also a copyright charge and production costs become high, and therefore, for example, with respect to musical composition performance data, at most several tens of pieces of music are preset.

Accordingly, since an electronic instrument maker presets musical sound control data to satisfy many users averagely, there are many cases where the data do not suit the level of proficiency and the preference of each user.

Conventionally, there is known a technique in which a user accesses a Web server apparatus, purchases desired musical composition performance data, and downloads the musical composition performance data into an electronic instrument (see patent document 1: JP-A-2003-050579).

However, it is necessary that the access must be made to the Web server apparatus from the electronic instrument having the Internet connection function or a personal computer, and the purchase processing and the download operation must be performed. The download operation imposes a burden on the user each time an attempt is made to obtain the content since the specification of the storage destination and the like are troublesome, and transfer time is required.

On the other hand, there is known a technique in which an external storage medium, such as a CD-ROM, storing many content data in a use-restricted state is distributed to a user. The user installs desired content data into an electronic instrument. Then, the user accesses a Web server apparatus and purchases the desired content data to release the use restriction (see patent document 2: JP-A-2001-331658).

However, the user must perform the install operation and must access the Web server apparatus to perform the purchase processing.

Thus, in both the methods, there is a problem that it takes a lot of trouble and time before the musical composition performance data can be used.

On the other hand, with respect to a purchase processing of content data, a method of using so-called electronic money is known.

The electronic money is such that the value of money is replaced by value data.

Although various electronic money is used, recently, there is a cellular phone with built-in noncontact IC chip in which electronic money is stored in a noncontact IC chip included in the cellular phone (see nonpatent document 1: "I-MODE OPERATION GUIDE, 04.11, the 62th edition", [Retrieval on November 2005], p. 57-61 Internet <URL: http://www.nttdocomo.co.jp/p#s/f/imode#sousa.html>; nonpatent document 2: [Development of i-mode (registered trademark) FeliCa (registered trademark)], NTT DoCoMo Technical Journal, Vol. 12 No. 3 (Oct. 1, 2004), THE TELECOMMUNICATIONS ASSOCIATION, p. 25-32).

The cellular phone with built-in noncontact IC chip receives an electromagnetic wave from a reading/writing device (Reader/Writer) which can communicate with a settlement server apparatus and which is provided in a cash register of a store, and the user can pay a fee by using electronic money or can charge (depositing) electronic money.

Besides, the cellular phone with built-in noncontact IC chip is used to do the Internet shopping, and payment can be made by using this electronic money, or the electronic money can be charged on the Internet.

Besides, a personal computer to which a reader/writer is connected is used to do the Internet shopping, and similarly, payment is made by using the electronic money, or the electronic money can be charged.

The payment by the cellular phone with built-in noncontact IC chip is convenient for the user.

However, a system has not been considered in which a reader/writer is connected to an equipment having no means for accessing a settlement server apparatus, and settlement using the electronic money is made from the equipment side.

SUMMARY OF THE INVENTION

The invention has been made to solve the foregoing problems, and provides a content data usage apparatus by which desired content data can be easily and quickly used.

Further, the invention provides a content data usage apparatus in which an IC chip storing electronic money is used, and settlement to enable use of content is made convenient.

According to a first aspect of the invention, a content data usage apparatus includes a protected storage unit in which plural content data are preset and stored in a state where a user cannot freely use, a content selection unit to cause the user to select a desired one from the plural content data, and a content use control unit which causes an external settlement apparatus to make settlement to enable use of the selected desired content data, and brings the desired content data into a usable state when a settlement completion notification is received from the settlement apparatus.

Accordingly, the desired content data can be easily and quickly used without newly acquiring it.

Even if many content data with high copyright charges or high production costs are preset, since the user pays a charge only for the selected desired content, an extra cost burden is not imposed on the user.

Besides, since the content data usage apparatus and the settlement apparatus are separated from each other, the mode of the settlement can be changed separately from the content data usage apparatus.

According to a second aspect of the invention, the content data usage apparatus of the first aspect includes an interface unit to connect to the Internet, and the content use control unit accesses a settlement server apparatus through the interface unit, then causes the settlement to be made, and receives the settlement completion notification.

Accordingly, when the Internet connection unit is provided on the content data usage apparatus side, since the settlement can be made by only the content data usage apparatus, a burden is not imposed on the user.

According to a third aspect of the invention, the content data usage apparatus of the first aspect includes an interface unit to perform writing/reading with respect to an IC chip which stores electronic money, and the content use control unit accesses the IC chip through the interface unit, causes the settlement using the electronic money to be made, and receives the settlement completion notification.

Accordingly, the settlement can be easily made by simply providing the interface unit to perform reading/writing with respect to the IC chip which stores the electronic money.

There is a case where connection and setting between devices for connecting to the Internet is difficult for a user of an electronic instrument.

However, since the invention of the third aspect performs a stand-alone operation in which connection to the Internet is not needed, knowledge of the Internet connection and the setting is unnecessary, invasion from the network does not occur, and the settlement processing is safe and it does not take time, and therefore, the burden of the user is lightened.

Since the settlement system using the electronic money is used, the settlement processing becomes simple for both the user and the maker.

According to a fourth aspect of the invention, in the content data usage apparatus of the third aspect, the IC chip is a noncontact IC chip included in a cellular phone, and the interface unit accesses the IC chip, causes the cellular phone to access a settlement server apparatus, causes the settlement using the electronic money to be made with the settlement server apparatus, and receives a notification of settlement completion from the IC chip.

Accordingly, even in the case where the settlement server apparatus is needed for the settlement using the electronic money, it is not necessary that an interface to access the settlement server apparatus is provided on the content data reproduction apparatus side. As a result, even a stand-alone equipment can make the settlement.

According to a fifth aspect of the invention, in the content data usage apparatus of the fourth aspect, the IC chip can store an electronic coupon in a storage area in addition to the electronic money, and when the electronic coupon remains in the storage area, the settlement is made by using the electronic coupon, and when no electronic coupon remains in the storage area, switching is made to the settlement using the electronic money.

According to a sixth aspect of the invention, in the content data usage apparatus of the fifth aspect, the cellular phone can store a program to perform a reading/writing processing with respect to the noncontact IC chip and a settlement processing, and the electronic coupon is set and stored by inputting an ID number of the content data usage apparatus when the program is installed or when a specified operation after installation is executed.

Although it takes time and is troublesome for the user to install the dedicated program into the cellular phone, in the invention of the fifth or the sixth aspect of the invention, the electronic coupon can be obtained as a privilege from the maker by the installation, and therefore, it is possible to facilitate not only the installation of the user, but also the use of the built-in content in the content data usage apparatus.

According to the invention, since the burden to acquire the content data is low on the user side, there is an effect that the desired content data can be easily used.

On the other hand, on the content data providing side, since it is not necessary to construct a system to provide many content data from a server apparatus on a network, or to distribute an external recording medium recording many content data, there is an effect that the burden is low also on the content data providing side.

DETAILED DESCRIPTION OF THE INVENTION

Figure 1:
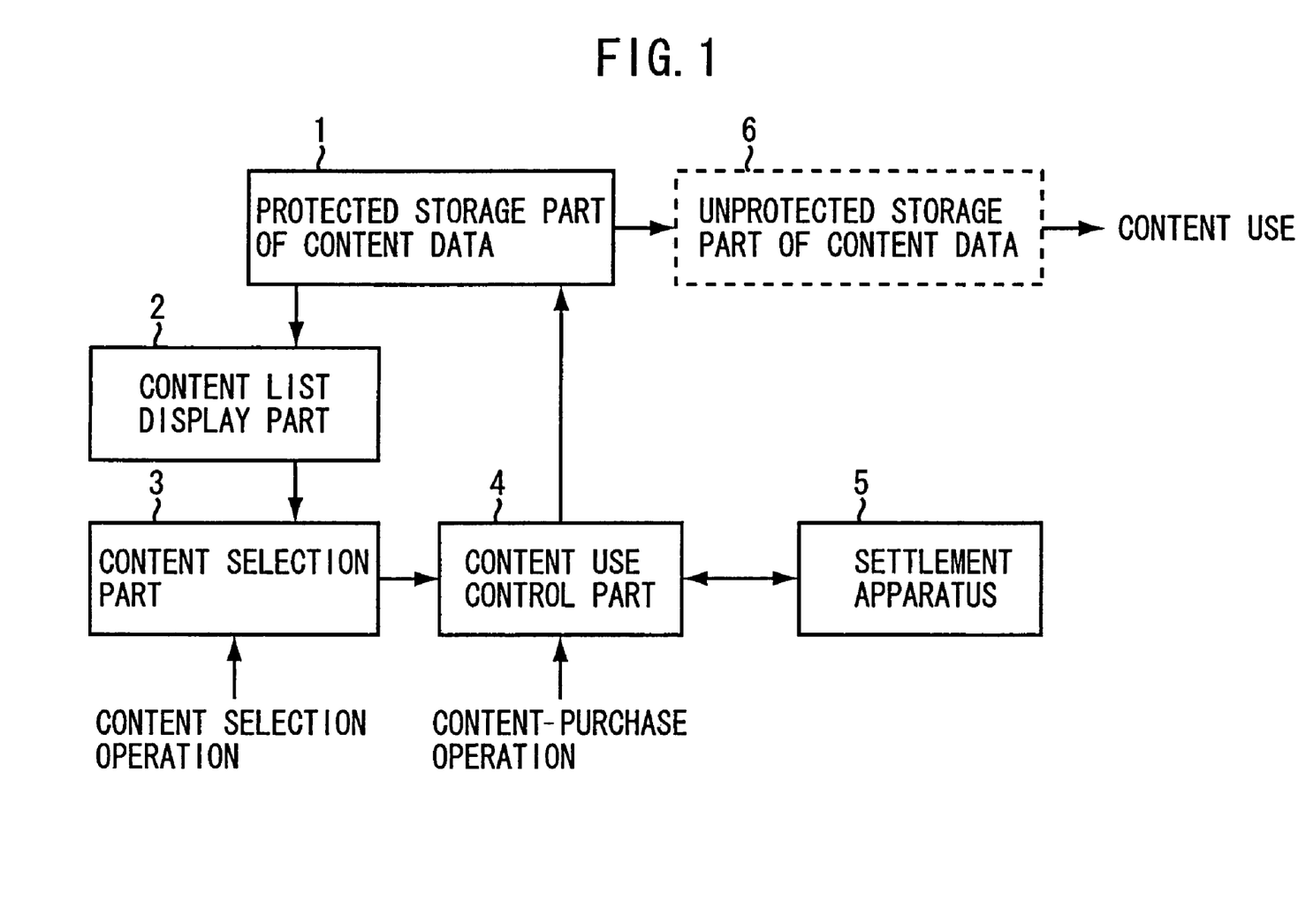
FIG. 1 is a functional structural view for explaining a content data reproduction apparatus of an embodiment of the invention.

FIG. 1 is a functional structural view for explaining a content data reproduction apparatus of an embodiment of the invention.

In the drawing, reference numeral 1 denotes a protected storage part of content data, in which many content data such as copy right musical compositions are preset and stored in a secure state where the user can not freely use them, and factory shipment is made. As a result, at the time point when the sale has been made, the content data can not be used.

The content data is made not to be freely read by management of the storage area. Free readout may be prohibited by encoding and storing the content data, or both may be used.

Part of the respective content data stored in the protected storage part 1 of the content data may be made to be capable of being tried (test-listen or preview), or content data for the trial may be separately stored.

Reference numeral 2 denotes a content list display part, and a list of the content data stored in the protected storage part 1 of the content data is displayed on a display. As the list of the content data, only bibliographic items such as titles of the content data may be acquired from the protected storage part 1 of the content data, or what is separately stored may be used.

Reference numeral 3 denotes a content selection part, which causes desired content data to be selected from plural content data displayed on the content list display part 2 in accordance with a content selection operation by the user.

Reference numeral 4 denotes a content use control part, which causes, in response to a content purchase operation of the user, a settlement apparatus 5 to perform a purchase processing of the desired content data selected by the content selection part 3, that is, to make settlement to enable use of the desired content data. When the settlement processing is completed and a settlement completion notification is received from the settlement apparatus 5, the desired content data is bring into a usable state.

Incidentally, after the operation to instruct the content purchase is performed, the content list is displayed and the content selection operation may be performed, or when the content selection operation is performed, the content purchase processing may be automatically performed.

The settlement apparatus 5 is, for example, a settlement server apparatus on the Internet.

The content data use control part 4 accesses the settlement apparatus 5 through a not-shown interface part to connect to the Internet. The settlement is made with the settlement apparatus 5 by using a credit card, electronic money or the like.

Besides, electronic money stored in a noncontact IC chip included in a cellular phone described in the related art (see nonpatent documents 1 and 2) may be used.

In this case, the settlement apparatus 5 to the content data use control part 4 is the noncontact IC chip to store the electronic money when viewed from the side of the content data use control part 4.

The content data use control part 4 accesses the noncontact IC chip through a not-shown interface part to perform reading/writing with respect to the noncontact IC chip, causes the settlement using the electronic money to be made, and receives the settlement completion notification.

The details will be described with reference to FIG. 2.

The content data read out of the protected storage part 1 of the content data may be written in an unprotected storage part 6 of content data as shown in the drawing. After this, the user can freely read the purchased music content from the unprotected storage part 6 of the content data. There is also a case where the use of the content data is restricted, for example, the number of times of use is restricted. In this case, when the number of times of use reaches a specified number of times, it is deleted from the unprotected storage part 6 of the content data.

The content data which is desired to be used can be selected by using the content selection part 3 or its equivalent from what are stored in the unprotected storage part 6 of the content data. The content list display part 2 may be used, and in that case, only the content which can be freely used may be listed, or a display may be performed such that freely usable content can be distinguished in the list of all content stored in the protected storage part 1 of the content data.

There is also a case where the unprotected part 6 of the content data is unnecessary.

For example, there is a use mode in which readout from the protected storage part 1 of the content data is performed only once and the reproduction is performed.

Besides, the content data which is enabled to be freely used may be made to be freely read without restriction by the storage management, while it is stored in the protected storage part 1 of the content data. For example, the secure state in which the user can not freely use is made to be freely usable by changing management data attached to the content data from an unusable state to an usable state.

Also in this case, the content selection part 3 and the content list display part 2 are used, and similarly to the foregoing description, content data desired to be reproduced can be made to be capable of being selected from freely readable content.

As the foregoing protected storage part 1 of the content data, in addition to a ROM in which rewriting can not be made, a flash memory or a small hard magnetic disk device can be used. On the other hand, as the unprotected storage part 6 of the content data, a flash memory, a small hard magnetic disk device, a RAM (Random Access Memory) which is erased when the power goes off, and the like can be used.

In the case where both are made the flash memory or the small hard magnetic disk device, the storage area is divided into a protected storage area and an unprotected storage area, and they may be separately managed.

Figure 2:
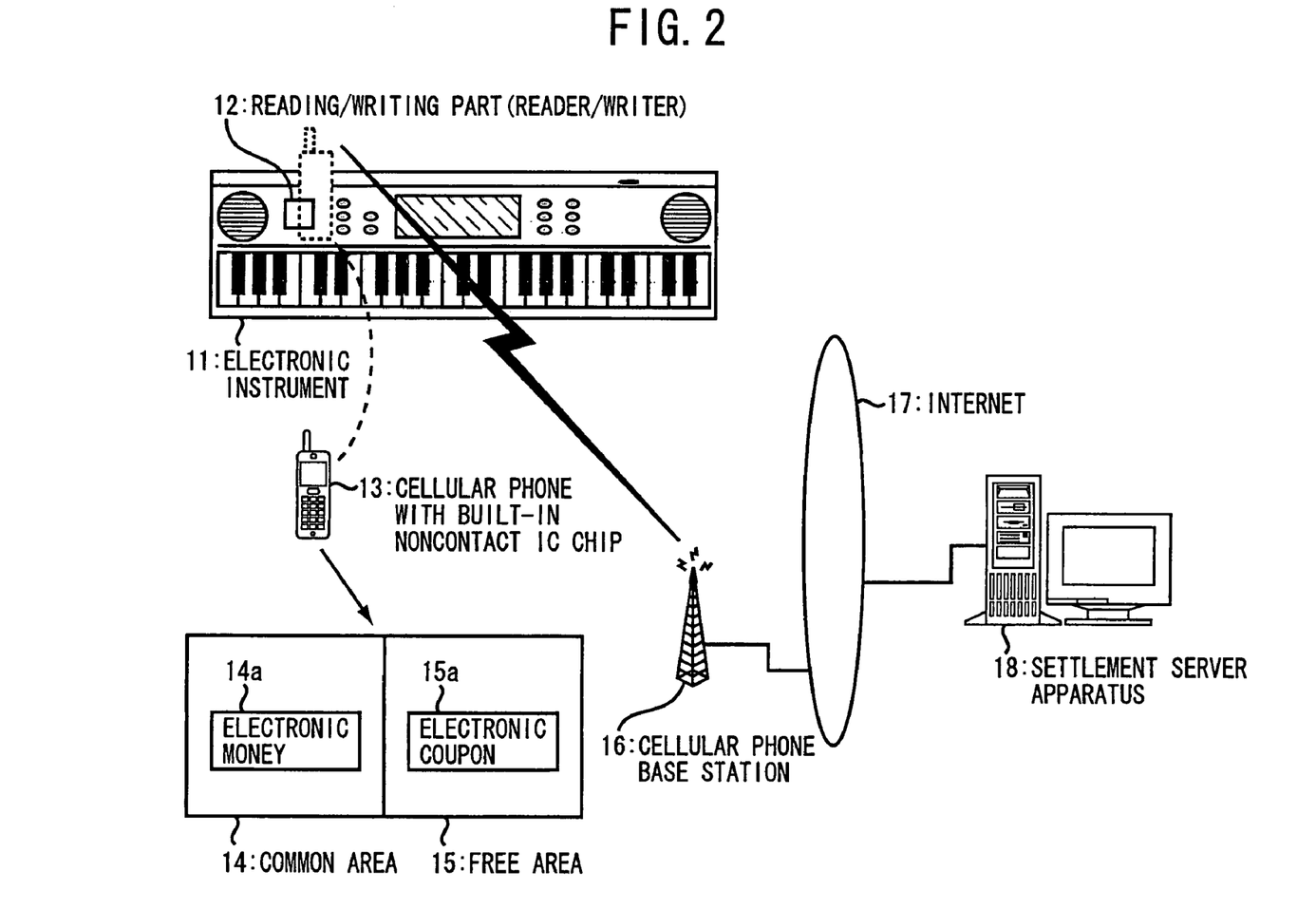
FIG. 2 is a system structural view showing a specific example in a case where a cellular phone having a built-in noncontact IC chip is used as a settlement tool in the functional structure shown in FIG. 1.

FIG. 2 is a system structural view showing a specific example in a case where a cellular phone 13 with built-in noncontact IC chip (hereinafter simply referred to as a cellular phone) is used as a tool of the settlement apparatus 5.

A description will be given to a case where the content data reproduction apparatus is an electronic instrument.

In the drawing, reference numeral 11 denotes an electronic instrument; and 12, a reading/writing part which reads/writes data from/to a nearly placed noncontact IC chip.

The cellular phone 13 stores an electronic money 14a in the noncontact IC chip. The noncontact IC chip is electrically connected to a main body circuit part of the cellular phone 13 and is accessed by a content purchase settlement application program of the electronic instrument 11, which is stored in the cellular phone 13, and reading/writing of data is performed.

In the noncontact IC chip, in addition to a common area 14 in which the electronic money 14a is stored, a free area 15 is set in which a coupon (hereinafter referred to as an electronic coupon) 15a without fee payment is stored.

The common area 14 is managed by an operational management company of an electronic money settlement system, and is used in the case where a service with high security is provided, and the area can be set for every service provider.

Accordingly, the electronic money 14a is made electronic money of this operational management company, and besides, the maker of the electronic instrument 11 becomes a service provider, and the electronic money may be exclusive to the maker of the electronic instrument 11.

On the other hand, the free area 15 is a data storage area which can be freely used without previous registration to the operational management company, and can store the electronic coupon 15a and the like. However, it is also possible to store the electronic coupon in the area of the service provider in the common area 14.

In this drawing, the whole network in which communication is made using the Internet protocol, including the cellular phone network, is united into one.

Reference numeral 16 denotes a base station installed in the cellular phone network; 17, the Internet; and 18, a settlement server apparatus.

The cellular phone 13 and the settlement server apparatus 18 perform communication for a settlement processing by using HTTP (Hypertext Transfer Protocol).

The user having purchased the electronic instrument 11 installs the content purchase settlement application program of the electronic instrument 11 into the cellular phone 13 from the server apparatus of the maker of the electronic instrument 11 in order to receive service. At that time, the identification of the purchase user can be performed by causing an ID number (manufacture number, etc.) unique to the electronic instrument 11 to be inputted.

A settlement system for the electronic instrument 11 is constructed of the electronic instrument 11, the settlement server apparatus 18 and the cellular phone 13.

That is, the settlement system for the electronic instrument (content data usage apparatus) 11 includes the protected storage unit in which plural content data are preset and stored in the state where the user can not freely use, the content selection unit to cause the user to select desired one from the plural content data, the interface unit to perform reading/writing with respect to the noncontact IC chip storing the electronic money, and the content use control part 4 which accesses the noncontact IC chip storing the electronic money through the interface unit and causes the settlement using the electronic money to be made, and brings the desired content data into the usable state when the settlement completion notification is received, the settlement server apparatus, and the cellular phone 13 which has the built-in noncontact IC chip, receives the access to the noncontact IC chip from the interface part, accesses the settlement server apparatus 18, causes the settlement using the electronic money to be made with the settlement server apparatus 18, and notifies the settlement completion to the interface unit from the IC chip.

In the noncontact IC chip, the plural electronic coupons 15*a* (for example, the electronic coupon of ten pieces of music) for using the music content at no charge can be written in the free area 15 previously or at an arbitrary time point.

The cellular phone 13 stores a dedicated program to perform the reading/writing processing with respect to the noncontact IC chip, the settlement processing with the settlement server, and the like. When the program is downloaded from the site managed by the maker of the electronic instrument 11 and is installed, or after the installation, when a specified operation is executed, a step of introducing the electronic coupon as the user privilege is started, and the electronic coupon is set and stored by inputting the ID number of the electronic instrument 11.

Although it takes time and is troublesome to install the dedicated program, since the electronic coupon as the privilege is obtained by that, not only the installation of the program, but also the use of the built-in content of the electronic instrument 11 is facilitated.

While the electronic coupon 15*a* remains, the electronic coupon 15*a* is used to make the settlement, and it is possible to cause the settlement completion to be notified to the reading/writing part 12. When the electronic coupon 15*a* disappears, switching is made to the settlement using the electronic money 14*a*, and the settlement to bring the desired content data into the usable state can be made with the settlement server apparatus by using the electronic money 14*a*.

Accordingly, from many preset content data, the content data can be made to be capable of being used at no charge by using the electronic coupon 15*a* until a specified number of pieces of music or a specified utilization amount of money is used. The remaining content data is made to be capable of being used by using the electronic money, and the providing service of the content data can be rationally performed. Besides, since the purchase operation can be tried at no charge by the electronic coupon 15*a*, the subsequent purchase of musical composition performance data using the electronic money can be facilitated.

Incidentally, in the case where the electronic money 14*a* is made the electronic money exclusive to the maker of the electronic instrument 11, the settlement can be completed only between the electronic instrument 11 and the cellular phone 13 without accessing the settlement server apparatus 18.

The content use control part 4 of the electronic instrument 11 accesses the noncontact IC chip through the reading/writing part 12, and may subtract a charge corresponding to the total number of the selected music contents from the balance of the electronic money 14*a*. This processing can also be performed without starting the application program of the cellular phone 13.

Figure 3:
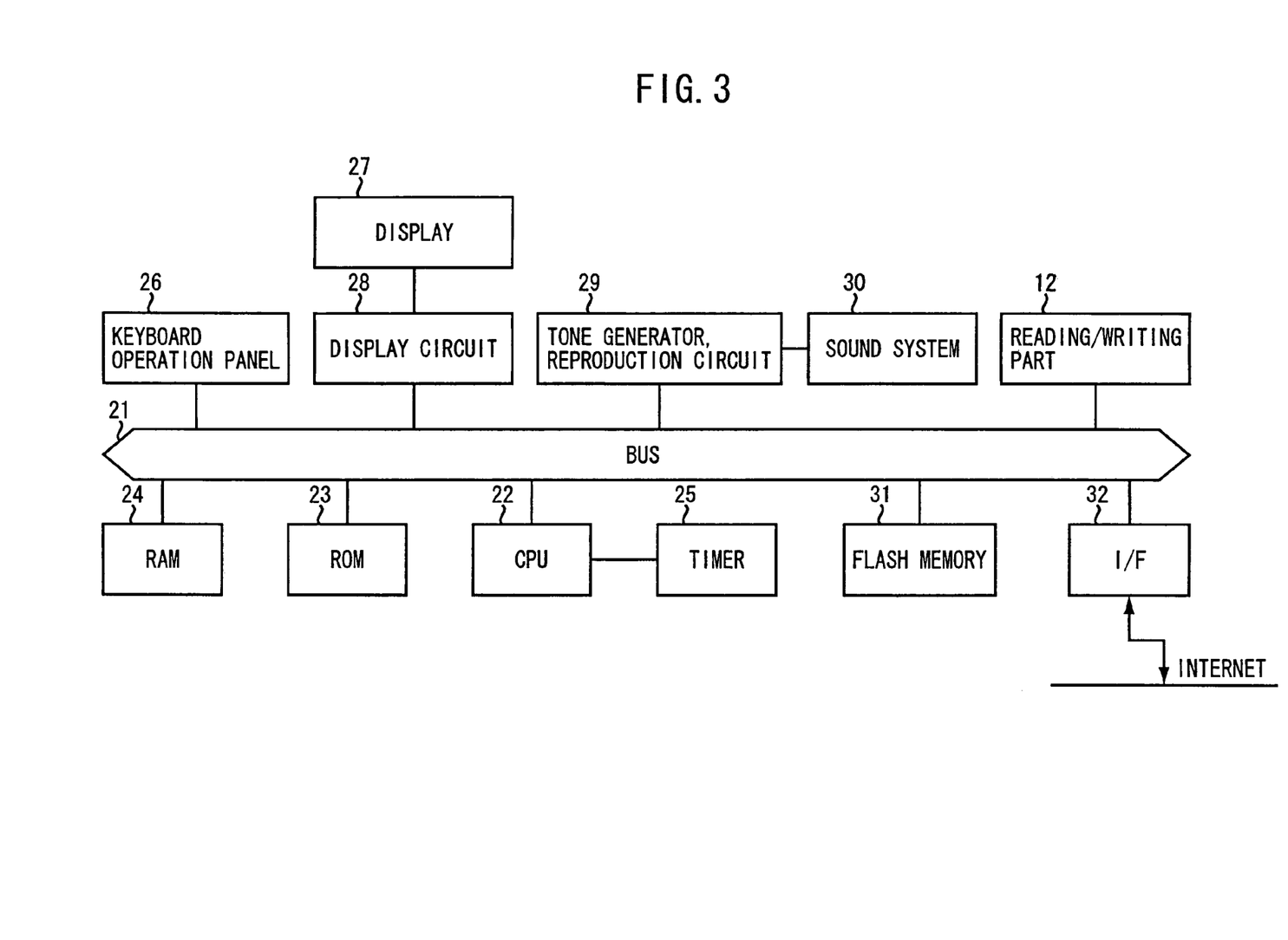
FIG. 3 is a block structural view showing an example of a hardware structure of an electronic instrument shown in FIG. 2.

FIG. 3 is a block structural view showing an example of a hardware structure of the electronic instrument 11 shown in FIG. 2.

The reading/writing part 12 for the noncontact IC chip shown in FIG. 2 is added to the structure of the electronic instrument which can be directly connected to the Internet.

Although the reading/writing part 12 is incorporated in the housing of the electronic instrument 11, it may be an external structure connected to the electronic instrument 11 through a USB (Universal Serial Bus) interface or the like.

In the drawing, reference numeral 21 denotes a bus; 22, a CPU (Central Processing Unit); 23, a ROM; and 24, a RAM.

The ROM 23 stores a control program to operate the CPU 22, music control data and the like. A partial area thereof is used as the protected storage part 1 of the content data shown in FIG. 1. The ROM 23 may be a flash memory.

Reference numeral 25 denotes a timer which measures an interrupt time in a timer interrupt processing.

Reference numeral 26 denotes various handlers on a keyboard and operation panel; 27, a display such as a liquid crystal display; and 28, a display circuit.

Reference numeral 29 denotes a tone generator and reproduction circuit; and 30, a sound system of an amplifier, a speaker and the like.

The tone generator circuit is provided to reproduce performance data of MIDI (Musical Instrument Digital Interface) format such as SMF (Standard MIDI File), and the decoder is provided to reproduce compressed audio waveform data such as MP3 (MPEG-1 Audio Layer-III). Namely, the tone generator and reproduction circuit 29 is a play unit which is operable to use the music content data for generating or reproducing music sounds according to the music content data.

Instead of this, the tone generator function (software tone generator) and the decoder function (software decoding) may be realized by executing a program by the CPU 22.

Reference numeral 31 denotes a flash memory which is used as the unprotected storage part 6 of the content data shown in FIG. 1.

Reference numeral 32 denotes a communication interface. For example, a USB-wireless LAN (Local Area Network) adopter and a modem apparatus with a wireless router are used, connection with the Internet is made through a communication network such as an ADSL (Asymmetric Digital Subscriber Line), and when access is made to the settlement server apparatus as the settlement apparatus 5 shown in FIG. 1, the settlement processing of the purchased content data can be performed.

The CPU 22 reads the control program stored in the ROM 23 into the RAM 24, and on the assumption of general control such as the operation event detection of the keyboard and operation panel 26, and display control to the display 27, the CPU controls the tone generator and the audio reproduction circuit 29 correspondingly to the performance control data, and causes the sound system 30 to output the music signal and audio signal.

Besides, the content use function as shown in FIG. 1 is executed.

Incidentally, the hardware structures of the settlement server apparatus 18 and the cellular phone 13 shown in FIG. 2 are well known, and the description will be omitted.

Figure 4A:
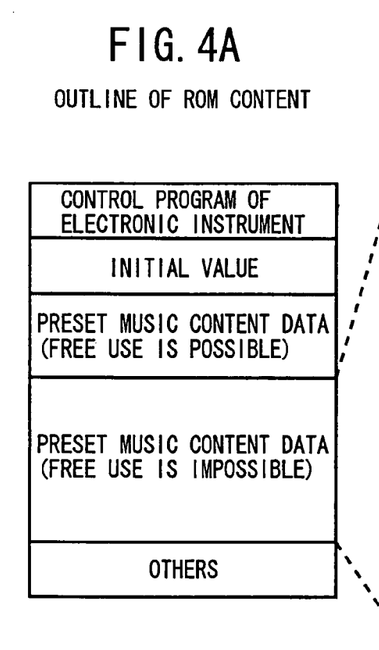
FIGS. 4A to 4C are explanatory views of an example of storage content of a ROM shown in FIG. 3.
Figure 4B:
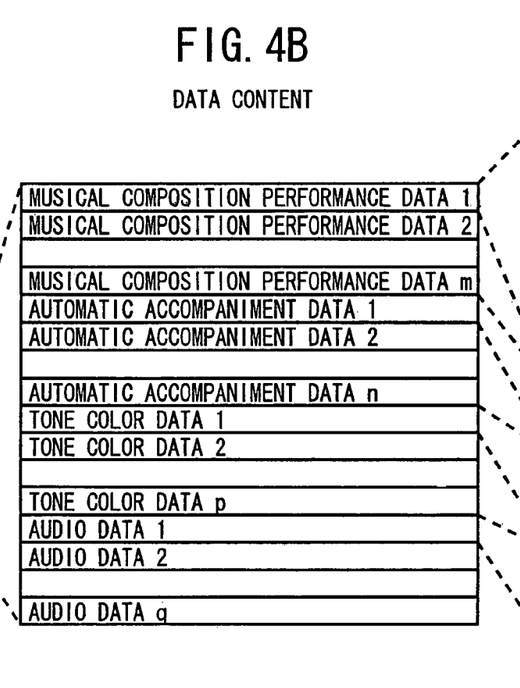
Figure 4C:
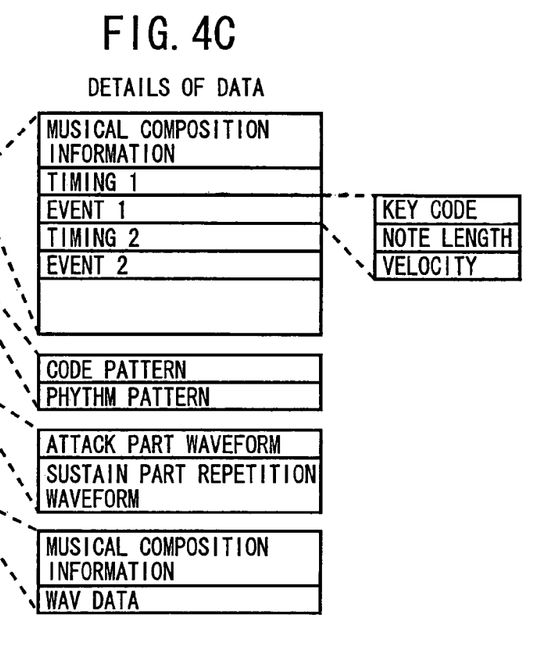

FIGS. 4A to 4C are explanatory views of an example of the storage content of the ROM 23 shown in FIG. 3.

As shown in FIG. 4A, the ROM 23 stores the control program of the electronic instrument 11, initial values, preset music content data (free use is possible), preset music content data (free use is impossible), and the other data.

FIG. 4B shows an example of the content. The storage area of the preset music content data incapable of being freely used stores musical composition performance data (1) to (m), automatic accompaniment data (1) to (n), tone color data (1) to (p), and audio data (1) to (q), and corresponds to the protected storage part 1 of the content data shown in FIG. 1.

The musical composition performance data (1) includes musical composition information such as, for example, a title and an artist, and note information made of a pair of an event and a timing. The event includes a key code to indicate the height of a note, the length of the note and the velocity to indicate the intensity of the note.

The automatic accompaniment data (1) includes a code pattern, a rhythm pattern and the like.

The tone color data (1) includes waveform data of an attack part, data of a repetition waveform of a sustain part and the like.

The audio data (1) includes musical composition information, and waveform data, WAV data in PCM. There is also a case where compression is made and recording is made.

FIGS. 5A to 7B are flowcharts for explaining the operations of the electronic instrument 11 and the like shown in FIG. 2. A method of directly accessing not-shown settlement server apparatuses A and B from the electronic instrument 11 to make settlement can also be selected.

Figure 5A:
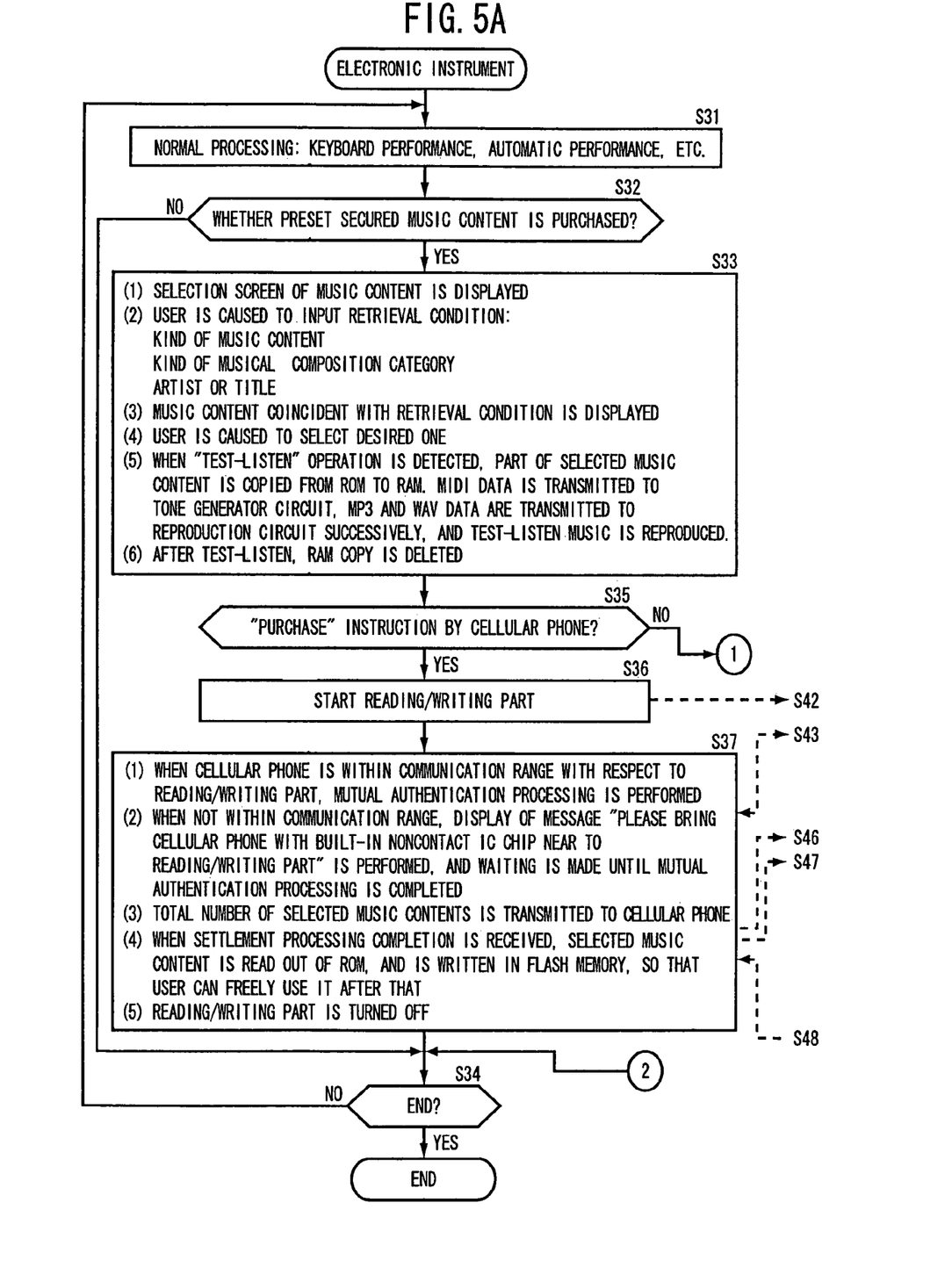
FIGS. 5A and 5B show a first flowchart for explaining the operation of the electronic instrument shown in FIG. 2.

FIG. 5A shows the processing of the electronic instrument 11, and the description will be mainly given to the processing to enable the use of content data.

At S31, a normal processing such as a keyboard performance or an automatic performance is performed.

At S32, when a purchase operation of partial content data of the preset secure music content data (free use is impossible) is performed, the processing proceeds to S33, and when not so, the processing proceeds to a termination processing of S34.

At S33, a selection screen of music content is displayed on the display 27, and the user is urged to input a retrieval condition. The music contents coincident with the retrieval condition are displayed, and the user is urged to select a desired one from them.

When a "test-listen" operation is detected, part of the selected music content is copied from the ROM 23 (storage area of the preset music content data (free use is impossible) of FIG. 4) shown in FIG. 4 to the RAM 24. Next, when the selected music content is MIDI data, it is transferred to the tone generator circuit in the tone generator and reproduction circuit 29 of FIG. 3. When the selected music content is MP3 data or WAV data, it is transferred to the reproduction circuit in the tone generator and reproduction circuit 29 of FIG. 3, and the test-listen music is reproduced from the sound system 30.

After the test-listen, the data copied in the RAM 24 is deleted.

Figures 6A, 6B:
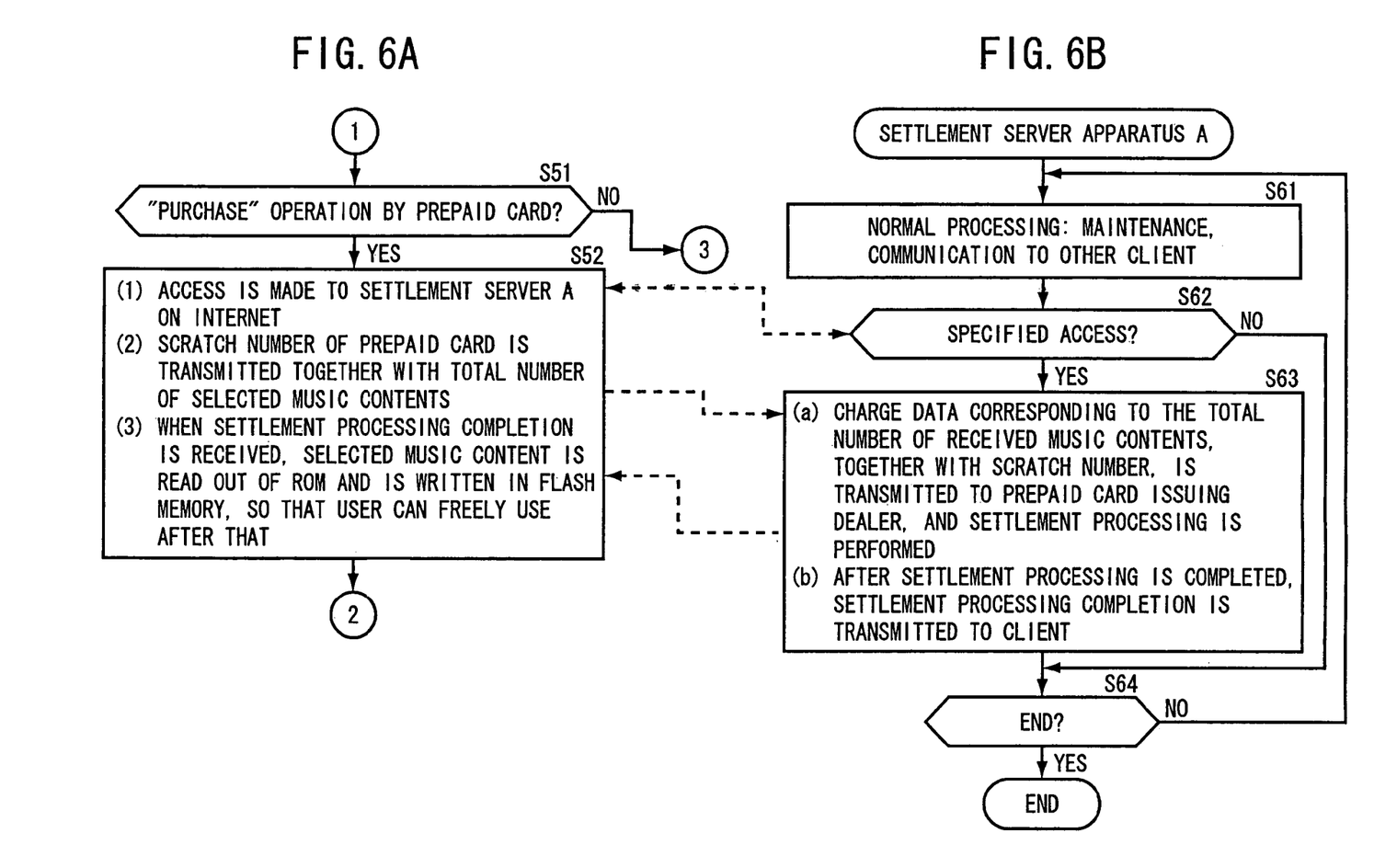
FIGS. 6A and 6B show a second flowchart for explaining the operation of the electronic instrument shown in FIG. 2.

At S35, it is judged whether "purchase" determined at S32 is an instruction of "purchase" by the cellular phone 13, and if so, the processing proceeds to S36, and if not so, the processing proceeds to S51 of FIG. 6A.

At S36, the reading/writing part 12 shown in FIGS. 2 and 3 is started, and the processing of S37 is executed.

That is, when the cellular phone 13 is within a communication range with respect to the reading/writing part 12, a mutual authentication processing is performed, and when not within the communication range, the display of "Please bring the cellular phone with built-in noncontact IC chip near to the reading/writing part" is performed, and waiting is made until the mutual authentication processing is completed.

When completed, the total number of the selected music contents is transmitted to the cellular phone 13. When the settlement processing completion is received from the cellular phone 13, the selected music content is read out of the ROM 23 and is written in the flash memory 31. The reading/writing part 12 is turned off, and at S34, when the user does not end the use of the electronic instrument 11, the processing is returned to S31 of the start.

Figure 5B:
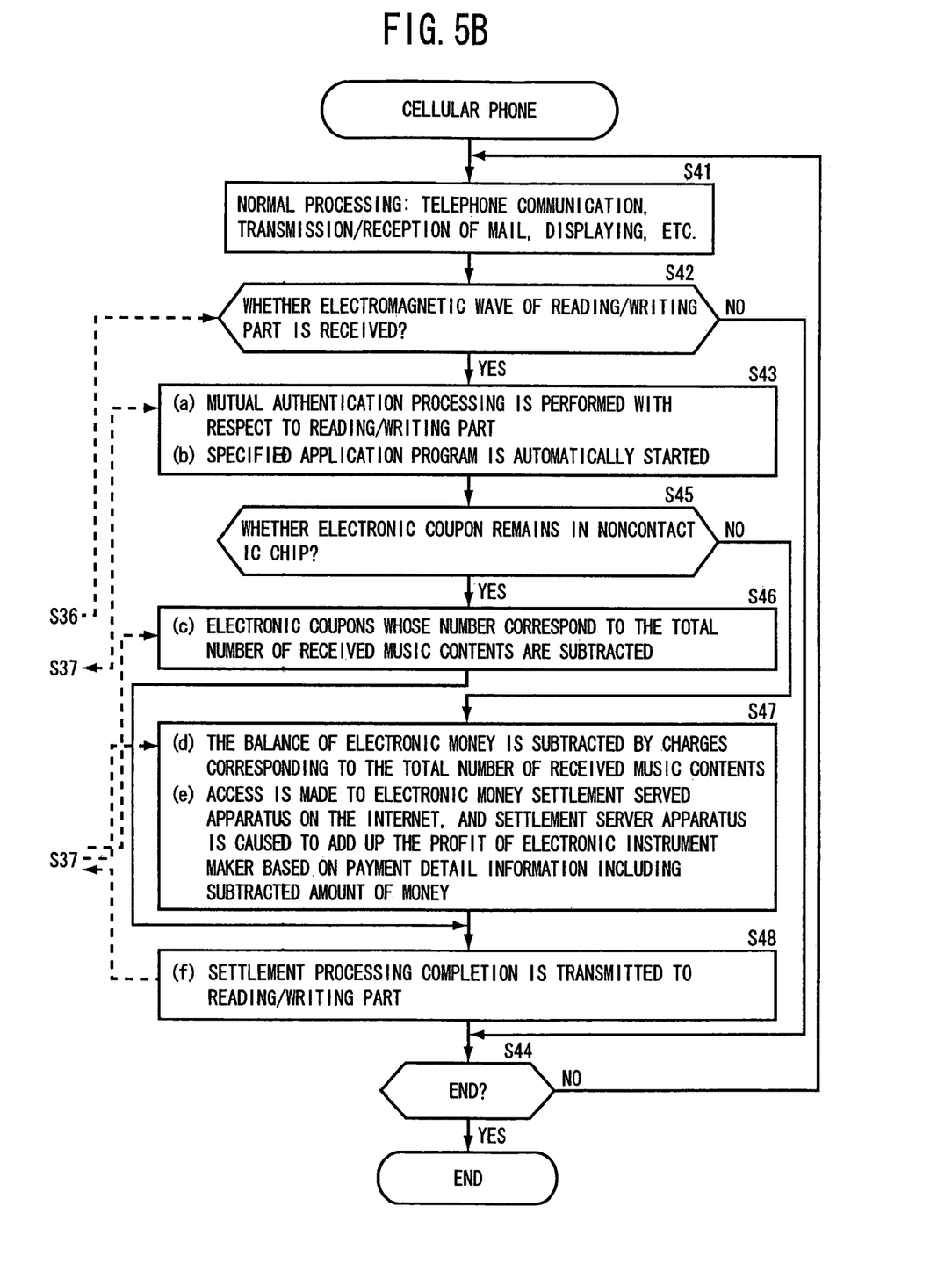

FIG. 5B shows the processing of the cellular phone 13, and the description will be mainly given to the settlement processing to enable the use of the content data.

At S41, a normal processing such as telephone communication, transmission/reception of mail, or display on a display is performed.

At S42, it is judged whether the noncontact IC chip has received the electromagnetic wave of the reading/writing part 12, and when received, the processing proceeds to S43, and when not received, the processing proceeds to a termination processing of S44.

At S43, the noncontact IC chip performs a mutual authentication processing with respect to the reading/writing part 12.

The noncontact IC chip automatically starts the application program for content purchase settlement of the electronic instrument 11, and executes the processing of S45 to S48 by this program.

At S45, when the electronic coupon 15a remains in the noncontact IC chip, the processing proceeds to S46, and when not remain, the processing proceeds to S47.

At S46, the electronic coupons 15a whose number corresponds to the total number of the music contents received from the reading/writing part 12 are subtracted from the noncontact IC chip, and the processing proceeds to S48.

At S47, the charge corresponding to the total number of the music contents received from the reading/writing part 12 is subtracted from the balance of the electronic money 14a of the common area 14.

Access is made to the electronic money settlement server apparatus (18 of FIG. 2) on the Internet, the settlement server apparatus 18 is made to add up the profit of the electronic instrument maker based on the payment detail information including the subtracted amount of money, and the processing proceeds to S48.

Incidentally, S45, S46 and S47 (only with respect to the reduction of the balance) can be performed by the content use control part 4 side of the electronic instrument 11, not by the cellular phone 13 side.

At S48, the settlement processing completion is transmitted to the reading/writing part 12.

At S44, when the user does not end the use of the cellular phone 13, the processing is returned to S41 of the start.

FIG. 6A is a flowchart showing the processing of the electronic instrument 11 subsequent to S35.

Figure 7A:
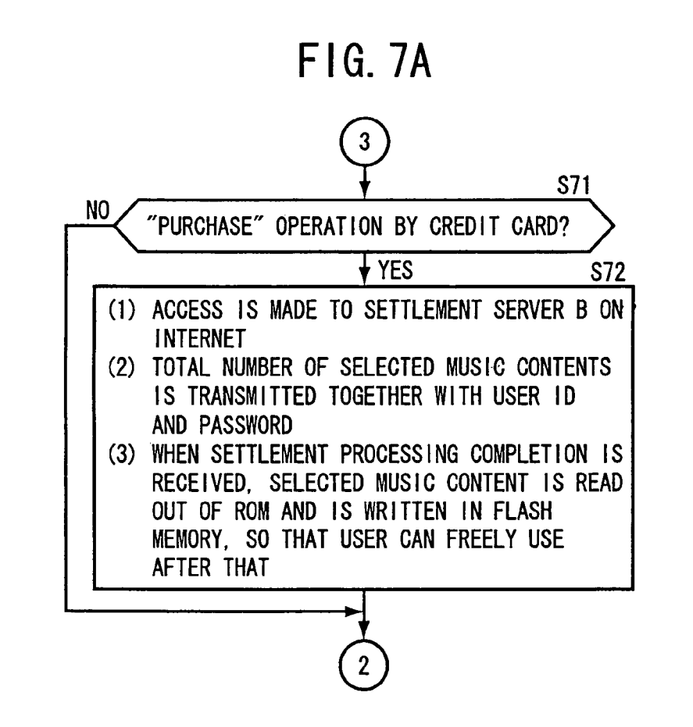
FIGS. 7A and 7B show a third flowchart for explaining the operation of the electronic instrument shown in FIG. 2.

At S51, it is judged whether the "purchase" operation by a prepaid card has been performed, and if so, the processing proceeds to S52, and if not so, the processing proceeds to S71 of FIG. 7A.

At S52, access is made to a settlement server apparatus A, which is not shown in FIG. 2, on the Internet, and a scratch number of prepaid electronic money, together with the total number of the selected music contents, is transmitted.

When the settlement processing completion is received from the settlement server apparatus A, the selected music content data is read out of the storage area of the preset music content data (free use is impossible) of the ROM 23 of FIGS. 3 and 4, and is written in the flash memory 31.

FIG. 6B is a flowchart showing a processing on the settlement server apparatus A side. The settlement server apparatus A is, for example, a Web server apparatus of the electronic instrument maker.

At S61, a normal processing such as maintenance or communication to the other client is performed.

At S62, if a specified access is made from the electronic instrument 11, the processing proceeds to S63, and if not, the processing proceeds to S64.

At S63, the charge data received from the electronic instrument 11 and corresponding to the total number of the music contents, together with the scratch number, is transmitted to the issuing trader of the prepaid electronic money, and the settlement processing is performed.

After the settlement processing is completed, the settlement processing completion is transmitted to the electronic instrument 11 as the client.

At S64, as long as the operation of the settlement server apparatus A is not ended, the processing is returned to S61 of the start.

FIG. 7A is a flowchart showing the processing of the electronic instrument 11 subsequent to S51 of FIG. 6A.

At S71, if the "purchase" operation by a credit card is performed, the processing proceeds to S72, and if not so, the processing proceeds to the termination processing of S34 shown in FIG. 5A.

At S72, access is made to the settlement server apparatus B on the Internet, and the total number of the selected music contents, together with the user ID and the password, is transmitted.

When the settlement processing completion is received from the settlement server apparatus B, the selected music content is written into the flash memory 31 from the storage area of the preset music content data (free use is impossible) of the ROM 23.

Figure 7B:
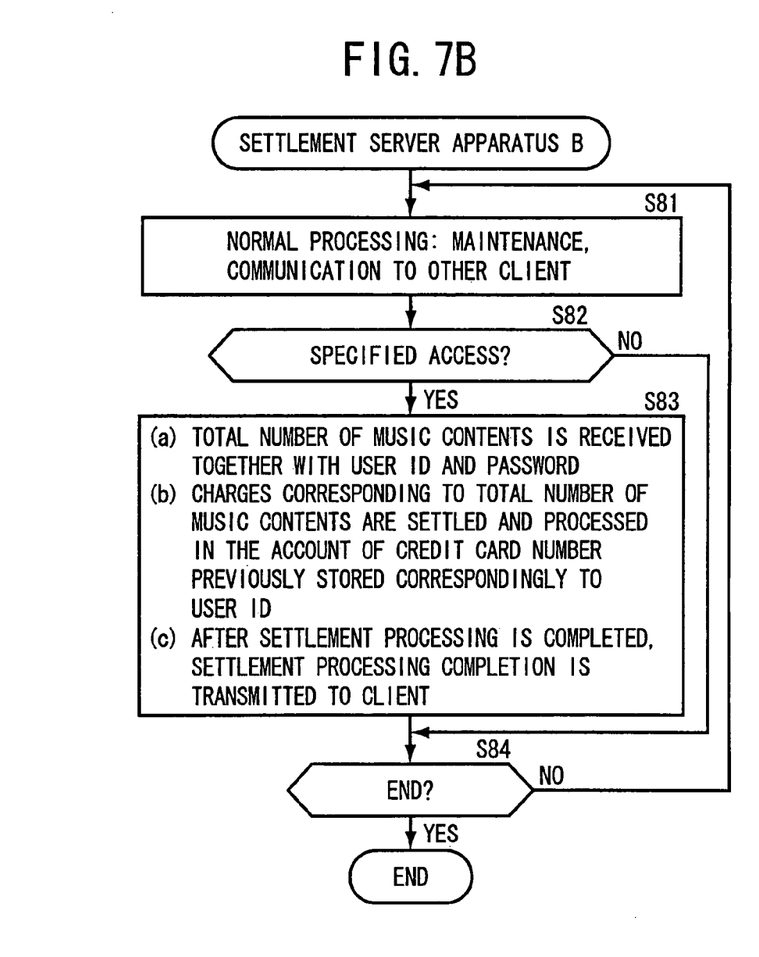

FIG. 7B is a flowchart showing the processing of the settlement server apparatus B side. The settlement server apparatus B is, for example, a Web server apparatus of Internet shopping of the electronic instrument maker.

At S81, a normal processing such as maintenance or communication to the other client is performed.

At S82, if a specified access is made from the electronic instrument 11, the processing proceeds to S83, and if not, the processing proceeds to S84.

At S83, the total number of the music contents, together with the user ID and the password received from the electronic instrument 11, is received, the fee corresponding to the total number of the music contents is settled in the account of the credit card number previously stored correspondingly to the user ID, and the settlement processing completion is transmitted to the electronic instrument 11 as the client.

At S84, as long as the operation of the settlement server apparatus B is not ended, the processing is returned to S81 of the start.

The description has been given to the case where the IC chip storing the electronic money is not in physical contact with the reading/writing part 12, and is built in the cellular phone 13.

As a result, the user performs an operation of holding the cellular phone 13 over the reading/writing part 12 and can easily make the settlement by using the general electronic money.

Besides, by changing the application program in the cellular phone 13, flexible measures can be taken against the change of the number of first provided electronic coupons, the subsequent provision of electronic coupons, the change of the site of the settlement server apparatus, or the like.

However, the IC chip storing the electronic money may be one electrically connected to the reading/writing part 12. Besides, the IC chip storing the electronic money may be contained in a portable IC card.

In the foregoing description, the description has been made while using the electronic musical instrument 11 as the example of the content data usage apparatus. However, it may be an audio apparatus which reproduces at least music content to enjoy, for example, a karaoke apparatus, a home theater apparatus, a television apparatus, a video recording and reproducing apparatus, or an electronic sound apparatus including a portable audio apparatus.

Besides, instead of the dedicated electronic music apparatus, a personal computer to realize the function of the electronic music apparatus by executing a computer program by a CPU may be used.

The content data may be anything as long as it is selected from many data and is used by the user, and is not limited to MIDI data of a musical composition, audio data of a musical composition, music data of a musical composition, image data of a musical composition or the like.

What is claimed is:

1. A content data usage apparatus in combination with a cellular phone having an IC chip that stores electronic money and at least one electronic coupon, and having a program installed for reading from and writing to the IC chip, comprising:

an interface unit configured to communicate with a remote settlement server via the cellular phone;

a protected storage unit configured to locally store a plurality of preset content data in an unusable state where a user is not permitted to access the preset content data;

a content selection unit configured to allow the user to select and purchase a desired one of the plurality of preset content data; and a content use control unit configured to allow the remote settlement server to settle the purchase of the selected content data to thereby enable access to the selected content data, wherein the content use control unit brings the selected content data into a usable state when the interface unit receives a completion notification indicating that the purchase is completed from the remote settlement server via the cellular phone, wherein the interface unit communicates with the cellular phone to access the program in the cellular phone to read from or write to the IC chip, and wherein the electronic coupon stored in the IC chip is activated for use with the content data usage apparatus with an ID number of the content data usage apparatus input when the program is installed in the cellular phone or by a specified operation with the cellular phone after the program is installed in the cellular phone.

2. The content data usage apparatus according to claim 1, wherein the interface unit connects to the remote settlement server via the cellular phone, which connects to a cellular phone base station, which connects to the remote settlement server via the Internet.

3. The content data usage apparatus according to claim 1, wherein the interface unit is operable in noncontact manner for accessing the IC chip, which is a noncontact type.

4. The content data usage apparatus according to claim 3, wherein the content use control unit first uses the electronic coupon for the settlement, and when no electronic coupon remains, the content use control unit uses the electronic money for the settlement.

5. An electronic musical instrument in combination with a cellular phone having an IC chip configured to store electronic money and at least one electronic coupon, and having a program installed for reading from and writing to the IC chip, comprising:

an interface unit configured to communicate with a remote settlement server via the cellular phone;

a protected storage unit configured to locally store a plurality of preset music content data in an unusable state where a user is not permitted to access the present content data;

a content selection unit configured to allow the user to select and purchase a desired one of the plurality of music content data;

a content use control unit configured to allow the remote settlement server to settle the purchase of the selected music content data to thereby enable access to the selected music content data, wherein the content user control unit brings the selected music content data into a usable state when the interface unit receives a completion notification indicating that the purchase is completed from the remote settlement server via the cellular phone apparatus, wherein the interface unit communicates with the cellular phone to access the program in the cellular phone to read from or write to the IC chip, and wherein the electronic coupon stored in the IC chip is activated for use with the content data usage apparatus with an ID number of the electronic musical instrument input when the program is installed in the cellular phone or by a specified operation with the cellular phone after the program is installed in the cellular phone; and a play unit configured to use the selected music content data for generating or reproducing music sounds according to the selected music content data.

6. The electronic musical instrument according to claim 5, wherein the interface unit is operable in noncontact manner for accessing the IC chip, which is a noncontact type.

* * * * *